United States Patent
Hsu et al.

(10) Patent No.: US 12,478,239 B2
(45) Date of Patent: Nov. 25, 2025

(54) DEVICE FOR CONDUCTING MOTOR RECOGNITION AND PROTECTION AND VACUUM CLEANER USING THE SAME

(71) Applicant: PROLIFIC TECHNOLOGY INC., Taipei (TW)

(72) Inventors: Chia-Chang Hsu, Hsinchu County (TW); Ren-Yuan Yu, Hsinchu County (TW)

(73) Assignee: PROLIFIC TECHNOLOGY INC., Taipei (TW)

( * ) Notice: Subject to any disclaimer, the term of this patent is extended or adjusted under 35 U.S.C. 154(b) by 383 days.

(21) Appl. No.: 18/201,377

(22) Filed: May 24, 2023

(65) Prior Publication Data

US 2023/0404346 A1   Dec. 21, 2023

(30) Foreign Application Priority Data

Jun. 8, 2022 (TW) .................................. 111121219

(51) Int. Cl.
*A47L 9/28* (2006.01)
*A47L 9/04* (2006.01)
*G01R 31/34* (2020.01)
*G01R 31/3835* (2019.01)

(52) U.S. Cl.
CPC ............ *A47L 9/2889* (2013.01); *A47L 9/0411* (2013.01); *A47L 9/2831* (2013.01); *A47L 9/2884* (2013.01); *G01R 31/343* (2013.01); *G01R 31/3835* (2019.01)

(58) Field of Classification Search
CPC .... A47L 9/2889; A47L 9/0411; A47L 9/2831; A47L 9/2884; G01R 31/343; G01R 31/3835
See application file for complete search history.

(56) References Cited

U.S. PATENT DOCUMENTS

2021/0251451 A1*   8/2021   Ko ...................... A47L 11/4011

* cited by examiner

*Primary Examiner* — Marc Carlson

(57) ABSTRACT

A device for conducting motor recognition and protection is disclosed. The device comprises a current detection circuit and a microprocessor, of which the current detection circuit is used for detecting an operation current from a roller brush driving motor that is integrated in a suction head of a vacuum cleaner. Moreover, the microprocessor is configured for determining a product model of the roller brush driving motor based on the operation current, deciding a protection parameter set according to the product model, and conducting a motor protection for the roller brush driving motor after loading at least one motor protection parameter contained by the protection parameter set.

14 Claims, 7 Drawing Sheets

DEVICE FOR CONDUCTING MOTOR RECOGNITION AND PROTECTION AND VACUUM CLEANER USING THE SAME

BACKGROUND OF THE INVENTION

1. Field of the Invention

The present invention relates to the technology field of vacuum cleaners, and more particularly to a device for being employed in a vacuum cleaner so as to conduct motor recognition and protection.

2. Description of the Prior Art

Vacuum cleaner has become a necessary household appliance in everyone else's family nowadays. FIG. 1 shows a stereo diagram of a conventional vacuum cleaner. As FIG. 1 shows, the conventional vacuum cleaner commonly comprises a machine body 11a, an extension connection tube 12a, a dust suction device 13a, and a rechargeable battery device 14a, of which the dust suction device 13a consists of a suction head 131a and a connection tube 132a. FIG. 2 illustrates a stereo diagram of the dust suction device 13a. As FIG. 2 shows, the dust suction device 13a is integrated with a roller brush 1311a and a roller brush driving motor 1312a therein. In case of the vacuum cleaner being operated to clean dust from a floor, the roller brush driving motor 1312a is controlled by a motor control circuit that is disposed in the machine body 11a, so as to drive the roller brush 1311a to rotate, thereby enhancing the dust clean efficiency of the vacuum cleaner.

For satisfying various requirements of dust cleaning, home appliance manufacturer develops and then provides multiple types of suction heads, including: direct drive cleaner head, soft roller cleaner head and mite removal cleaner head. As explained in more detail below, if the suction head 131a of the dust suction device 13a is a direct drive cleaner head, the vacuum cleaner 1a is suitable for use in cleaning dust from a carpet. On the other hand, in case of the suction head 131a of the dust suction device 13a is a soft roller cleaner head, the vacuum cleaner 1a can be used to clean dust from a specific floor that has a hard surface. Otherwise, if the suction head 131a of the dust suction device 13a is a mite removal cleaner head, the vacuum cleaner 1a is suitable for use in cleaning mites from a mattress, a quilt or a blanket.

It is worth mentioning that, the machine body 11a is further integrated with a motor protection circuit therein. Therefore, when the vacuum cleaner 1a works normally, the motor protection circuit is enabled to provide a suitable protection to the roller brush driving motor 1312a according to an operation state of the roller brush driving motor 1312a, such as over load protection, short-circuit protection, and rotor locking protection. However, since the direct drive cleaner head, the roller cleaner head and the mite removal cleaner head are certainly not equipped with an identical type of roller brush driving motor, the motor protection circuit needs to be configured by an instruction containing a specific motor protection parameter as providing a suitable protection to a specific type of roller brush driving motor. It is a pity that, because the conventional motor protection circuit is unable to recognize the type of the roller brush driving motor, the motor protection circuit fails to be automatically load right motor protection parameter corresponding to the specific type of the roller brush driving motor. As a result, the conventional motor protection circuit fails to provide a suitable and complete protection to the roller brush driving motor.

According to above descriptions, it is understood that there are still rooms for improvement in the vacuum cleaner. In view of this fact, inventors of the present application have made great efforts to make inventive research and eventually provided a device for conducting motor recognition and protection and vacuum cleaner using the same.

SUMMARY OF THE INVENTION

The primary objective of the present invention is to disclose a device for being employed in a vacuum cleaner so as to conduct motor recognition and protection. The device comprises a current detection circuit and a microprocessor, of which the current detection circuit is used for detecting an operation current from a roller brush driving motor that is integrated in a suction head of the vacuum cleaner. Moreover, the microprocessor is configured for determining a product model of the roller brush driving motor based on the operation current, deciding a protection parameter set according to the product model, and conducting a motor protection for the roller brush driving motor after loading at least one motor protection parameter contained by the protection parameter set. In which, the protection parameter set comprises overload protection parameter, short-circuit protection parameter, and rotor locking protection parameter.

For achieving the primary objective mentioned above, the present invention provides an embodiment of the device for conducting motor recognition and protection, which is allowed to be employed in a vacuum cleaner comprising a machine body and a dust suction device, wherein the dust suction device consists of a suction head and a connection tube, and the suction head includes a roller brush and a roller brush driving motor; said device comprises:
  a current detection circuit, being coupled to the roller brush driving motor for detecting an operation current; and
  a microprocessor, being coupled to the current detection circuit;
  wherein the microprocessor includes a memory storing an application program, and the application program including instructions, such that in case the application program is executed, the microprocessor being configured for:
  receiving the operation current from the current detection circuit in a run-up time period of the roller brush driving motor;
  determining a product model of the roller brush driving motor based on the operation current;
  deciding a protection parameter set according to the product model; and
  conducting a motor protection for the roller brush driving motor after loading at least one motor protection parameter contained by the protection parameter set.

Moreover, the present invention also provides an embodiment of a vacuum cleaner, which comprises a machine body and a dust suction device that consists of a suction head and a connection tube, and the suction head is equipped with a roller brush and a roller brush driving motor; characterized in that the vacuum cleaner further comprises one the foregoing device for conducting motor recognition and protection.

In one embodiment, the memory further stores a first lookup table and a second lookup table, the first lookup table records a plurality of motor internal resistances and a plurality of model numbers respectively corresponding to the plurality of motor internal resistances, and the second lookup table records the plurality of model numbers and a plurality of protection parameter sets corresponding to the plurality of model numbers.

In one embodiment, the microprocessor calculates a motor internal resistance based one the operation current, subsequently finds out one model number from the first lookup table according to the motor internal resistance, and then finds out one protection parameter set that comprises overload protection parameter, short-circuit protection parameter, and rotor locking protection parameter from the second lookup table according to the model number.

In one practicable embodiment, the device for conducting motor recognition and protection further comprises:
  a rotation speed detection circuit, being coupled to the roller brush driving motor and the microprocessor, and being configured for detecting a rotation speed of the roller brush driving motor.

In another one practicable embodiment, the device for conducting motor recognition and protection further comprises:
  a battery voltage detection circuit, being coupled to a rechargeable battery device of the vacuum cleaner, and being also coupled to the microprocessor;
  wherein the battery voltage detection circuit is configured for detecting a real-time battery voltage of the rechargeable battery device, such that the microprocessor applies a proportional up-regulation treatment or a proportional down-regulation treatment to the at least one motor protection parameter according to the real-time battery voltage.

In one embodiment, the microprocessor is further configured for:
  receiving a rotation speed sampling signal from the rotation speed detection circuit, and then calculating a real-time rotation speed of the roller brush driving motor;
  determining a load condition of the roller brush driving motor based on the real-time rotation speed and the operation current;
  deciding one protection parameter set according to the product model and the load condition; and
  conducting one motor protection for the roller brush driving motor after loading the at least one motor protection parameter contained by the protection parameter set.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a device for conducting motor recognition and protection according to the present invention, embodiments of the present invention will be described in detail with reference to the attached drawings hereinafter.

Figure 1:
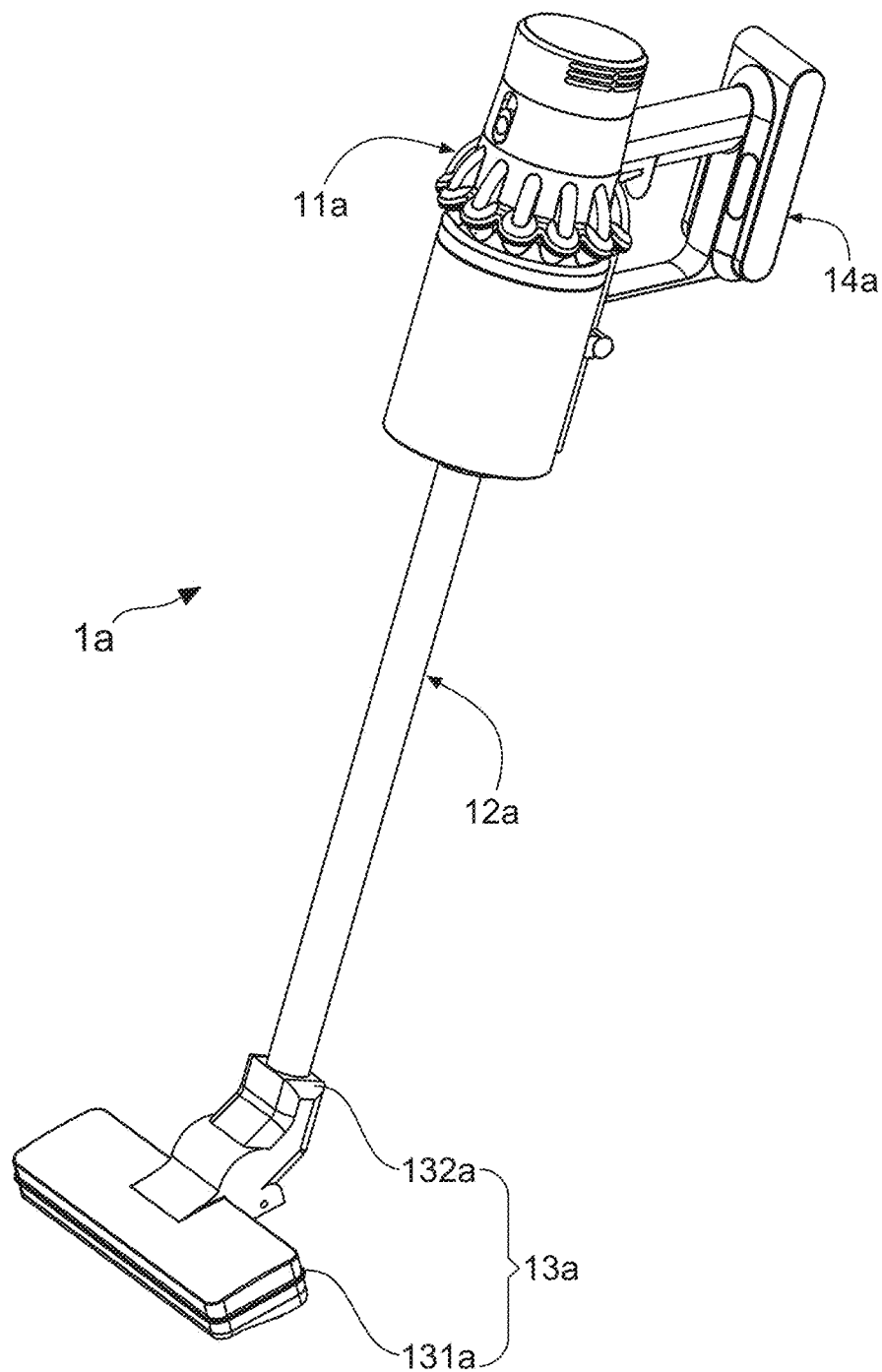
FIG. 1 shows a stereo diagram of a conventional vacuum cleaner.
Figure 2:
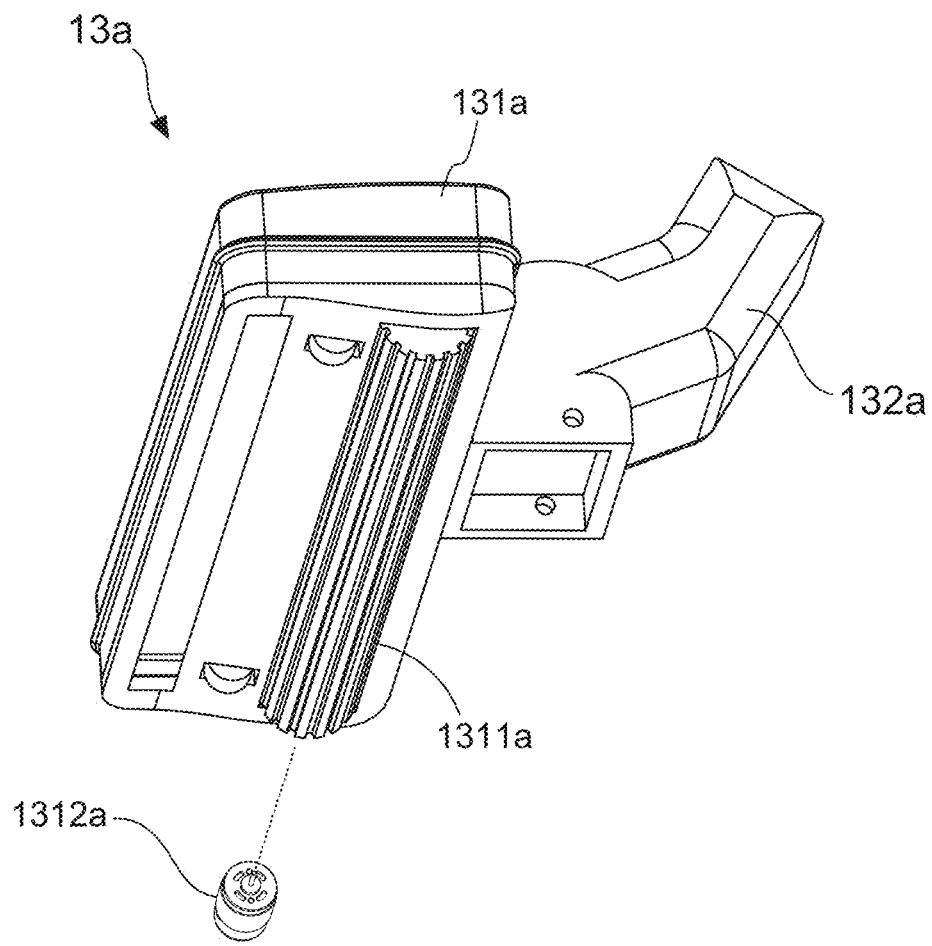
FIG. 2 shows a stereo diagram of a dust suction device as illustrated in FIG. 1.
Figure 3:
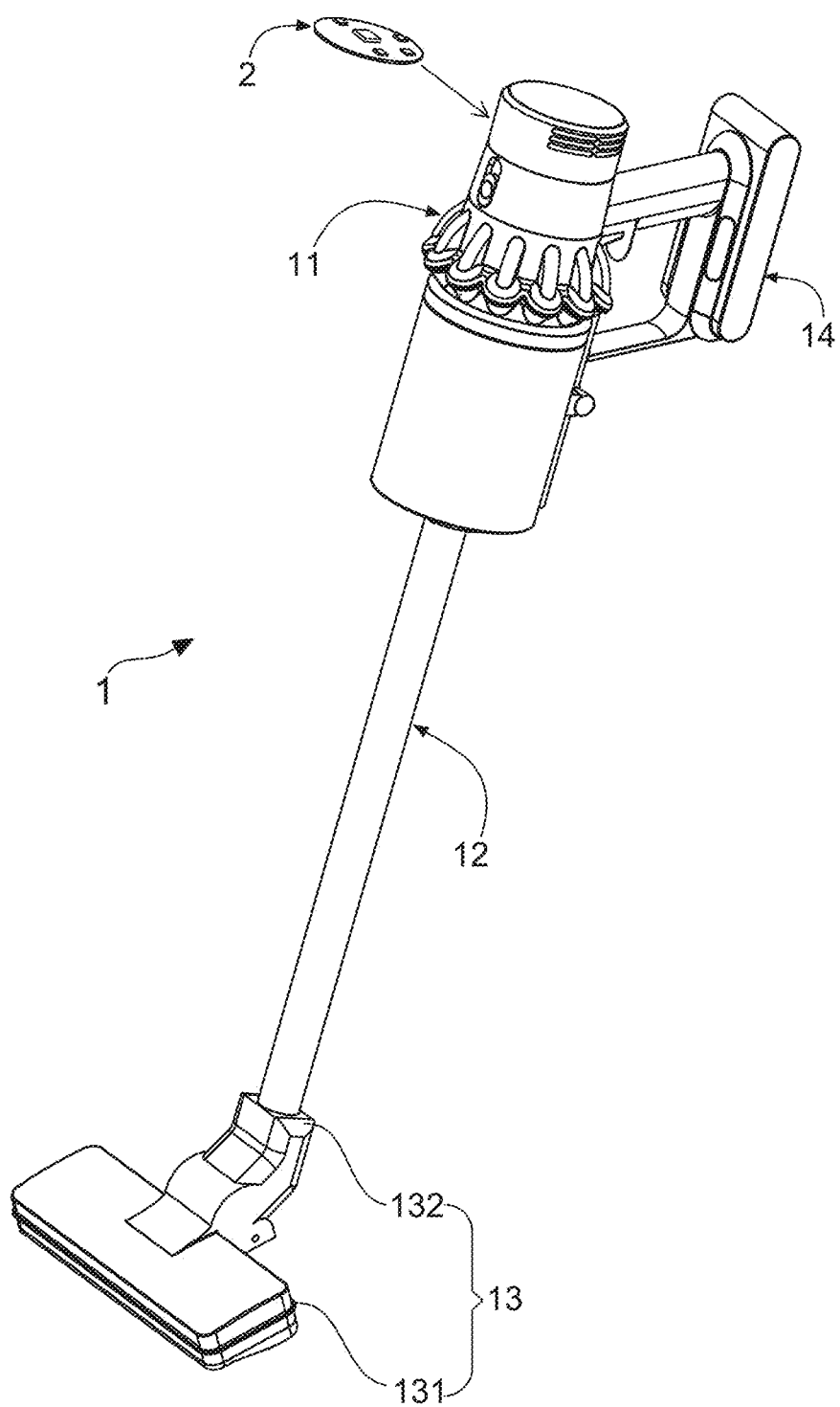
FIG. 3 shows a stereo diagram of a vacuum cleaner that includes a device for conducting motor recognition and protection according to the present invention.
Figure 4:
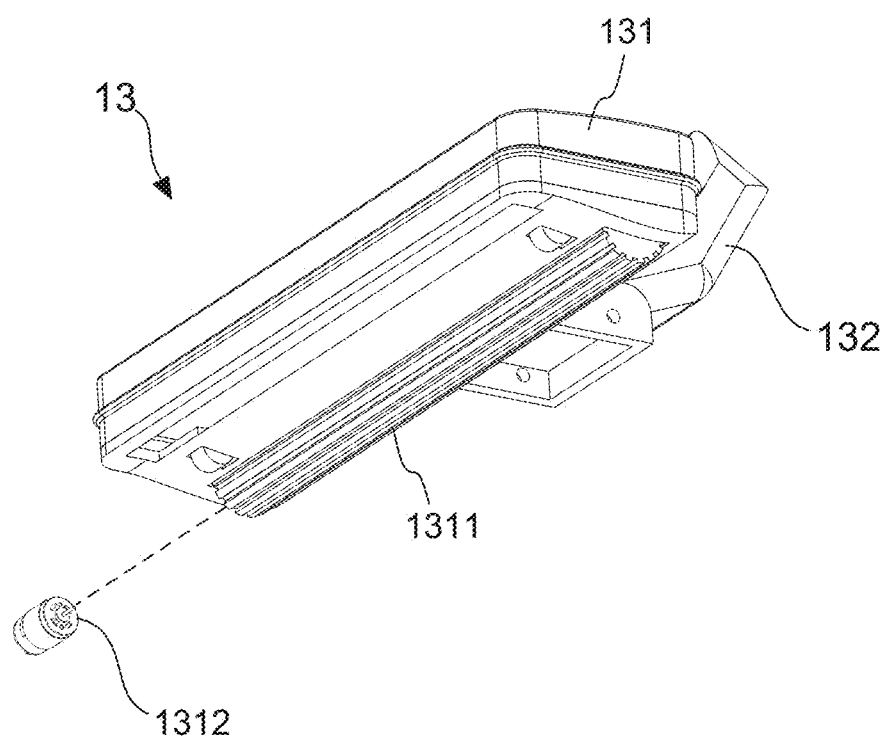
FIG. 4 shows a stereo diagram of a dust suction device as illustrated in FIG. 3.

With reference to FIG. 3, there is shown a stereo diagram of a vacuum cleaner that includes a device for conducting motor recognition and protection according to the present invention. As FIG. 3 shows, the vacuum cleaner 1 consists of a machine body 11, an extension connection tube 12, a dust suction device 13, a rechargeable battery device 14, and a device 2 for conducting motor recognition and protection, of which the dust suction device 13 consists of a suction head 131 and a connection tube 132. Furthermore, FIG. 4 illustrates a stereo diagram of the dust suction device 13. As FIG. 4 shows, the suction head 131 is equipped with a roller brush 1311 and a roller brush driving motor 1312. In case of the vacuum cleaner 1 being operated to clean dust from a floor, the roller brush driving motor 1312 is controlled by a motor control circuit that is disposed in the machine body 11, so as to drive the roller brush 1311 to rotate, thereby enhancing the dust clean efficiency of the vacuum cleaner 1.

Figure 5:
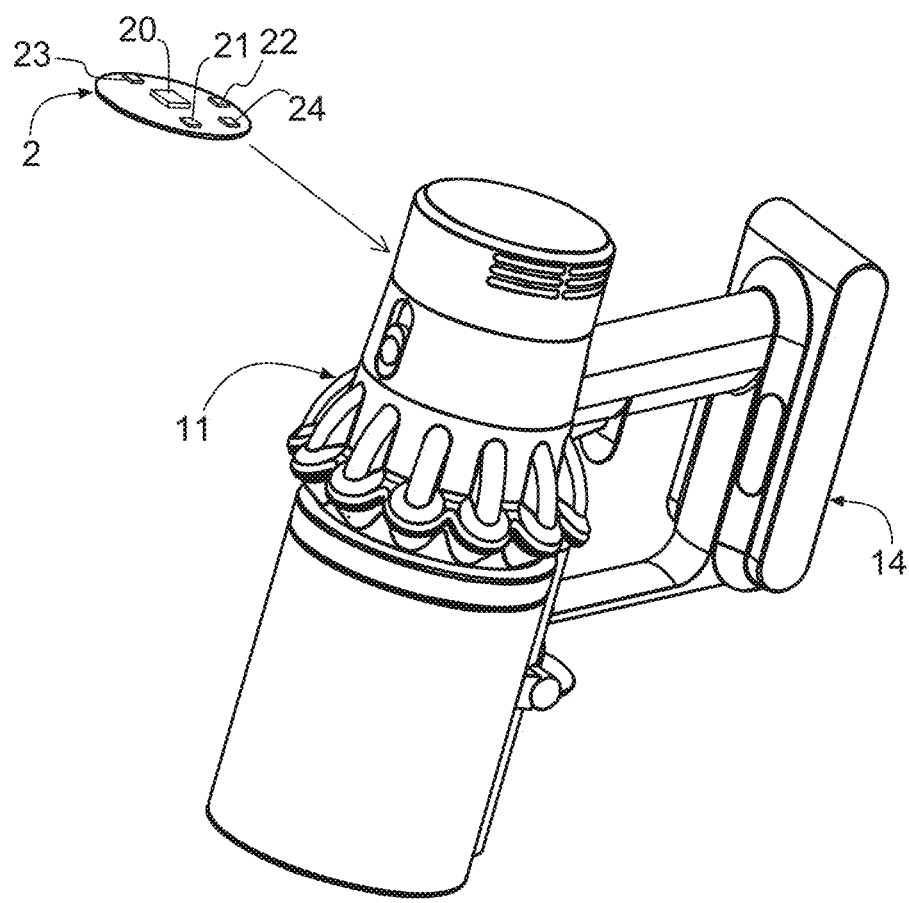
FIG. 5 shows a stereo diagram of a machine body and a rechargeable battery device as illustrated in FIG. 3.
Figure 6:
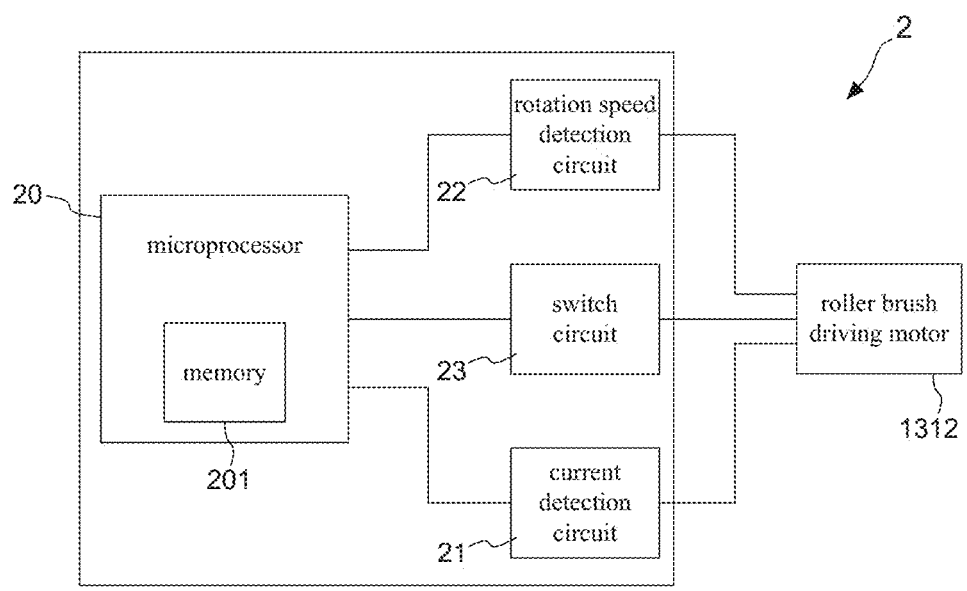
FIG. 6 shows a first block diagram of the device for conducting motor recognition and protection according to the present invention.

FIG. 5 illustrates a stereo diagram of the machine body 11 and the rechargeable battery device 14 as illustrated in FIG. 3. Moreover, FIG. 6 depicts a first block diagram of the device 2 for conducting motor recognition and protection. As FIG. 4, FIG. 5 and FIG. 6 show, the device 2 according to the present invention comprises: a microprocessor 20, a current detection circuit 21, a rotation speed detection circuit 22, and a switch circuit 23, of which the current detection circuit 21 is coupled to the roller brush driving motor 1312 for detecting an operation current, and the rotation speed detection circuit 22 is also coupled to the roller brush driving motor 1312 for acquiring a rotation speed signal. Moreover, the microprocessor 20 is coupled to the current detection circuit 21 for receiving the operation current, and is also coupled to the rotation speed detection circuit 22 for receiving the rotation speed signal, so as to calculate a real-time rotation speed of the roller brush driving motor 1312. On the other hand, the switch circuit 23 is coupled between the microprocessor 20 and the roller brush driving motor 1312.

According to the present invention, the microprocessor 20 includes a memory 201 that stores an application program, and the application program includes instructions, such that in case the application program is executed, the microprocessor is configured for receiving the operation current from the current detection circuit 21 in a run-up time period of the roller brush driving motor 1312. Subsequently, the microprocessor 20 is configured for determining a product model of the roller brush driving motor 1312 based on the operation current. Consequently, the microprocessor is configured for deciding a protection parameter set according to the product model, and then conducting a motor protection for the roller brush driving motor 1312 after loading at least one motor protection parameter contained by the protection parameter set. As explained in more detail below, the microprocessor 20 calculates, by utilizing following mathematical equation (1), a motor internal resistance of the roller brush driving motor 1312 based the operation current:

$$\omega = \frac{V_{DC} - I*R}{K_e} \quad (1)$$

In the foregoing mathematical equation (1), Ke is a back-emf constant, I is the operation current, ω is the rotation speed, $V_{DC}$ is a DC voltage applied to the roller brush driving motor 1312, and R is the motor internal resistance. Therefore, in case of Ke, ω, I, and $V_{DC}$ being all acquired, the motor internal resistance R can be calculated by using the mathematical equation (1).

Following table (1), table (2) and table (3) record the basic motor parameters of three types of DC motors (i.e., the roller brush driving motor 1312). Furthermore, following table (4) records the stall current, the motor internal resistance and the operation current (@ No load) of the three types of DC motors.

TABLE 1

| DC motor with model number I | $V_{DC}$ = 21.6 ± 5% V | |
|---|---|---|
| | Operation current (A) | Rotation speed (RPM) |
| @ No load | 0.13 | 11600 |
| @ Max efficiency | 0.62 | 9582 |
| Stall current | 2.93 A | |
| Internal resistance | 7.37 Ω | |

TABLE 2

| DC motor with model number II | $V_{DC}$ = 21.6 ± 5% V | |
|---|---|---|
| | Operation current (A) | Rotation speed (RPM) |
| @ No load | 0.12 | 8006 |
| @ Max efficiency | 0.67 | 6785 |
| Stall current | 3.70 A | |
| Internal resistance | 5.84 Ω | |

TABLE 3

| DC motor with model number II | $V_{DC}$ = 21.6 ± 5% V | |
|---|---|---|
| | Operation current (A) | Rotation speed (RPM) |
| @ No load | 0.29 | 10171 |
| @ Max efficiency | 1.89 | 8818 |
| Stall current | 12.343 A | |
| Internal resistance | 1.75 Ω | |

TABLE 4

| | Internal resistance (Ω) | Operation current (A) | Stall current (A) |
|---|---|---|---|
| DC motor with model number I | 7.37 | 0.62 | 2.93 |
| DC motor with model number II | 5.84 | 0.67 | 3.7 |
| DC motor with model number III | 1.75 | 1.89 | 12.343 |

According to the above tables (1)-(4), it is easily understood that each of the motor parameters (i.e., internal resistance, operation current and stall current) of the three types of DC motors are different from each other as being applied by a DC voltage of 21.6V. Therefore, the present invention further stores a first lookup table and a second lookup table in the memory 201, of which the first lookup table records a plurality of motor internal resistances and a plurality of model numbers respectively corresponding to the plurality of motor internal resistances, and the second lookup table records the plurality of model numbers and a plurality of protection parameter sets corresponding to the plurality of model numbers. By such arrangements, the microprocessor 20 is able to calculate the motor internal resistance of the roller brush driving motor 1312 after acquiring the operation current and the real-time rotation speed. Subsequently, the microprocessor 20 finds out one model number from the first lookup table according to the calculated motor internal resistance, and then finds out one protection parameter set that comprises overload protection parameter, short-circuit protection parameter, and rotor locking protection parameter from the second lookup table according to the model number.

It is worth explaining that, because the load condition of the roller brush driving motor 1312 is steady in the run-up time period, the rotation speed and the operation current would not change abruptly. For this reason, according to the present invention, the current detection circuit 21 is used for detecting an operation current of the roller brush driving motor 1312, the rotation speed detection circuit 22 is adopted for collecting a rotation speed signal from the roller brush driving motor 1312, and the microprocessor 20 is configured to receive the operation current and the rotation speed signal from the current detection circuit 21 and the rotation speed detection circuit 22 in the run-up time period. After that, the microprocessor 20 calculates a real-time rotation speed of the roller brush driving motor 1312 based on the rotation speed signal, and then calculates a motor internal resistance of the roller brush driving motor 1312 by using the foregoing mathematical equation (1).

After the motor internal resistance of the roller brush driving motor 1312 is calculated, the microprocessor 20 subsequently finds out one model number from the first lookup table according to the motor internal resistance, and then finds out one protection parameter set that comprises overload protection parameter, short-circuit protection parameter, and rotor locking protection parameter from the second lookup table according to the model number. As a result, the microprocessor 20 conducts a motor protection for the roller brush driving motor 1312 after loading at least one motor protection parameter contained by the protection parameter set.

Following table (5) exemplarily records some motor protection parameters for the tree types of DC motors (i.e., roller brush driving motor 1312).

TABLE 5

| | Threshold value of stall current (rotor locking parameter) | Threshold value of overload current (overload protection parameter) |
|---|---|---|
| DC motor with model number I | 2.05 A | 1.46 A |
| DC motor with model number II | 2.59 A | 1.85 A |

TABLE 5-continued

| | Threshold value of stall current (rotor locking parameter) | Threshold value of overload current (overload protection parameter) |
|---|---|---|
| DC motor with model number III | 8.62 A | 6.16 A |

As such, after loading the at least one motor protection parameter listed in able table (5), the microprocessor 20 is able to provide a suitable and complete protection to the roller brush driving motor 1312. For example, the DC motor with model number I has a normal operation current 0.62 A (@ 9582 RPM) and a stall current 2.93 A (@ $V_{DC}$=21.6V), such that a threshold value of the overload current (i.e., overload protection parameter) and a threshold value of the stall current (i.e., rotor locking parameter) of the DC motor can be set to be 1.46 A and 2.05 A, respectively. Similarly, a threshold value of the overload current (i.e., overload protection parameter) and a threshold value of the stall current (i.e., rotor locking parameter) of the DC motor with model number II can be set to be 1.85 A and 2.59 A, respectively. Moreover, a threshold value of the overload current (i.e., overload protection parameter) and a threshold value of the stall current (i.e., rotor locking parameter) of the DC motor with model number III can be set to be 6.16 A and 8.62 A, respectively. In addition, FIG. 6 also depicts that the switch circuit 23 is coupled between the microprocessor 20 and the roller brush driving motor 1312. By such arrangement, in case of the microprocessor 20 deciding to stop the rotation of the roller brush driving motor 1312 according to the measured operation current, the load condition and/or the rotation speed, the microprocessor 20 controls the switch circuit 23 to stop the rotation of the roller brush driving motor 1312, thereby achieving a suitable and complete protection of the roller brush driving motor 1312.

Figure 7:
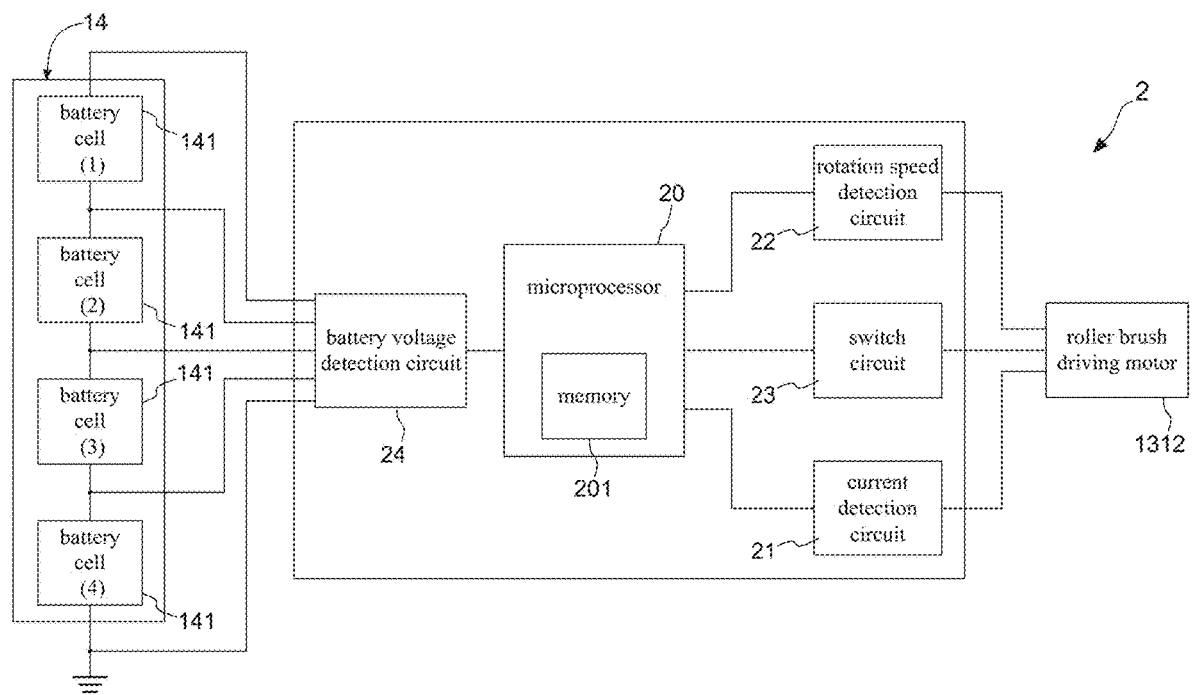
FIG. 7 shows a second block diagram of the device for conducting motor recognition and protection according to the present invention.

Please refer to FIG. 3, FIG. 4 and FIG. 5 again, and simultaneously refer to FIG. 7 showing a second block diagram of the device for conducting motor recognition and protection. As FIG. 7 shows, the device 2 further comprises a battery voltage detection circuit 24, which is coupled to a rechargeable battery device 14 of the vacuum cleaner 1, and is also coupled to the microprocessor 20. By such arrangement, the battery voltage detection circuit 24 is adopted for detecting a real-time battery voltage of the rechargeable battery device 14 that consists of a plurality of battery cells 141, such that the microprocessor 20 applies a proportional up-regulation treatment or a proportional down-regulation treatment to the at least one motor protection parameter according to the real-time battery voltage.

On the other hand, use environment of the vacuum cleaner 1 may lead the load condition of the roller brush driving motor 1312 to be changed. For example, if the suction head 131 of the dust suction device 13 is a direct drive cleaner head, the vacuum cleaner 1 is used for cleaning dust from a carpet. In such case, the load condition of the roller brush driving motor 1312 may be increased, and the continuously increased load condition would eventually cause the roller brush driving motor 1312 be broken due to overheat. On the other hand, in case of the suction head 131 of the dust suction device 13 is a soft roller cleaner head, the vacuum cleaner 1 is used for cleaning dust from a specific floor that has a hard surface. In such case, the load condition of the roller brush driving motor 1312 may be declined, and the continuously declined load condition would consequently cause the roller brush driving motor 1312 work at no load.

Considering to the foregoing facts, the microprocessor 20 is also configured for deciding at least one motor protection parameter based on the measured operation current, the real-time load condition and the real-time rotation speed. For example, the DC motor with model number I has a normal operation current 0.62 A (@ 9582 RPM) and a no-load operation current 0.13 A (@ 11600 RPM), the DC motor with model number III has a normal operation current 1.89 A (@ 8818 RPM) and a no-load operation current 29 A (@ 10171 RPM).

Following table (6), table (7) and table (8) record some motor protection parameters for the tree types of DC motors (i.e., roller brush driving motor 1312).

TABLE 6

| DC motor with | Battery voltage | | |
|---|---|---|---|
| model number I | 18 V | 21.6 V | 24.2 V |
| Stall current (regular value) | 2.442 | 2.931 | 3.284 |
| −15% error | 2.076 | 2.491 | 2.791 |
| Threshold value of stall current (rotor locking parameter) | 2.076 | 2.491 | 2.791 |
| Threshold value of overload current (overload protection parameter) | 1.221 | 1.465 | 1.642 |

TABLE 7

| DC motor with | Battery voltage | | |
|---|---|---|---|
| model number II | 18 V | 21.6 V | 24.2 V |
| Stall current (regular value) | 3.082 | 3.699 | 4.144 |
| −15% error | 2.620 | 3.144 | 3.522 |
| Threshold value of stall current (rotor locking parameter) | 2.620 | 3.144 | 3.522 |
| Threshold value of overload current (overload protection parameter) | 1.541 | 1.849 | 2.072 |

TABLE 8

| DC motor with | Battery voltage | | |
|---|---|---|---|
| model number III | 18 V | 21.6 V | 24.2 V |
| Stall current (regular value) | 10.286 | 12.343 | 13.829 |
| −15% error | 8.743 | 10.491 | 11.754 |
| Threshold value of stall current (rotor locking parameter) | 8.743 | 10.491 | 11.754 |
| Threshold value of overload current (overload protection parameter) | 5.143 | 6.171 | 6.914 |

It needs to explain that, the phrase "−15% error" means a lower-threshold value of the motor protection parameter (i.e., rotor locking parameter and overload protection parameter) decided by the microprocessor 20. In other words, the rotor locking parameter can be set to be a lower-threshold value of the stall current, and the overload protection parameter can be set to be a lower-threshold value of the overload current. When implementing the device 2 in a vacuum cleaner 1, it is not limited to store the first lookup table and the second lookup table in the memory 201. In one practicable embodiment, the microprocessor 20 can be configured to directly calculate a motor internal resistance of the roller brush driving motor 1312, and then determines, according to the motor internal resistance, the model number of the roller brush driving motor 1312 by comparison.

Moreover, in another one practicable embodiment, the microprocessor 20 can be configured to directly calculate a motor internal resistance of the roller brush driving motor 1312, and then determines, according to the operation current, the load condition and the motor internal resistance, the model number of the roller brush driving motor 1312 by comparison.

Therefore, through above descriptions, all embodiments and their constituting elements of the device for conducting motor recognition and protection according to the present invention have been introduced completely and clearly; in summary, the present invention includes the advantages of:

(1) The present invention proposes a device 2 for being employed in a vacuum cleaner 1 so as to conduct motor recognition and protection. The device 2 comprises a current detection circuit 21 and a microprocessor 20, of which the current detection circuit 21 is used for detecting an operation current from a roller brush driving motor 1312 that is integrated in a suction head 131 of the vacuum cleaner 1. Moreover, the microprocessor 20 is configured for determining a product model of the roller brush driving motor 1312 based on the operation current, deciding a protection parameter set according to the product model, and conducting a motor protection for the roller brush driving motor 1312 after loading at least one motor protection parameter contained by the protection parameter set. In which, the protection parameter set comprises overload protection parameter, short-circuit protection parameter, and rotor locking protection parameter.

(2) Moreover, the device 2 further comprises a battery voltage detection circuit 24 coupled to a rechargeable battery device 14 of the vacuum cleaner 1. By such arrangement, after the battery voltage detection circuit 24 detects a real-time battery voltage of the rechargeable battery device 14, the microprocessor 20 is subsequently configured to apply a proportional up-regulation treatment or a proportional down-regulation treatment to the at least one motor protection parameter according to the real-time battery voltage.

The above description is made on embodiments of the present invention. However, the embodiments are not intended to limit the scope of the present invention, and all equivalent implementations or alterations within the spirit of the present invention still fall within the scope of the present invention.

What is claimed is:

1. A device for conducting motor recognition and protection, being allowed to be employed in a vacuum cleaner comprising a machine body and a dust suction device, wherein the dust suction device consists of a suction head and a connection tube, and the suction head including a roller brush and a roller brush driving motor; said device comprising:
   a current detection circuit, being coupled to the roller brush driving motor for detecting an operation current; and
   a microprocessor, being coupled to the current detection circuit;
   wherein the microprocessor includes a memory storing an application program, and the application program including instructions, such that in case the application program is executed, the microprocessor being configured for:
   receiving the operation current from the current detection circuit in a run-up time period of the roller brush driving motor;
   determining a product model of the roller brush driving motor based on the operation current;
   deciding a protection parameter set according to the product model; and
   conducting a motor protection for the roller brush driving motor after loading at least one motor protection parameter contained by the protection parameter set.

2. The device of claim 1, wherein the memory further stores a first lookup table and a second lookup table, the first lookup table recording a plurality of motor internal resistances and a plurality of model numbers respectively corresponding to the plurality of motor internal resistances, and the second lookup table recording the plurality of model numbers and a plurality of protection parameter sets corresponding to the plurality of model numbers.

3. The device of claim 2, wherein the microprocessor calculates a motor internal resistance based one the operation current, subsequently finding out one model number from the first lookup table according to the motor internal resistance, and then finding out one protection parameter set that comprises overload protection parameter, short-circuit protection parameter, and rotor locking protection parameter from the second lookup table according to the model number.

4. The device of claim 2, further comprising:
   a rotation speed detection circuit, being coupled to the roller brush driving motor and the microprocessor, and being configured for detecting a rotation speed of the roller brush driving motor.

5. The device of claim 3, further comprising:
   a battery voltage detection circuit, being coupled to a rechargeable battery device of the vacuum cleaner, and being also coupled to the microprocessor;
   wherein the battery voltage detection circuit is configured for detecting a real-time battery voltage of the rechargeable battery device, such that the microprocessor applies a proportional up-regulation treatment or a proportional down-regulation treatment to the at least one motor protection parameter according to the real-time battery voltage.

6. The device of claim 4, wherein the microprocessor is further configured for:
   receiving a rotation speed sampling signal from the rotation speed detection circuit, and then calculating a real-time rotation speed of the roller brush driving motor;
   determining a load condition of the roller brush driving motor based on the real-time rotation speed and the operation current;
   deciding one protection parameter set according to the product model and the load condition; and conducting one motor protection for the roller brush driving motor after loading the at least one motor protection parameter contained by the protection parameter set.

7. A vacuum cleaner, comprising a machine body and a dust suction device that consists of a suction head and a connection tube, and the suction head is equipped with a roller brush and a roller brush driving motor; characterized in that the vacuum cleaner further comprises a device for conducting motor recognition and protection, and said device comprising:

a current detection circuit, being coupled to the roller brush driving motor for detecting an operation current; and a microprocessor, being coupled to the current detection circuit;

wherein the microprocessor includes a memory storing an application program, and the application program including instructions, such that in case the application program is executed, the microprocessor being configured for:

receiving the operation current from the current detection circuit in a run-up time period of the roller brush driving motor;

determining a product model of the roller brush driving motor based on the operation current;

deciding a protection parameter set according to the product model; and conducting a motor protection for the roller brush driving motor after loading at least one motor protection parameter contained by the protection parameter set.

8. The vacuum cleaner of claim 7, wherein the memory further stores a first lookup table and a second lookup table, the first lookup table recording a plurality of motor internal resistances and a plurality of model numbers respectively corresponding to the plurality of motor internal resistances, and the second lookup table recording the plurality of model numbers and a plurality of protection parameter sets corresponding to the plurality of model numbers.

9. The vacuum cleaner of claim 8, wherein the microprocessor finds out one motor internal resistance and one model number from the first lookup table according to the operation current, and subsequently finding out one protection parameter set that comprises overload protection parameter, short-circuit protection parameter, and rotor locking protection parameter from the second lookup table according to the model number.

10. The vacuum cleaner of claim 8, wherein said device further comprises:

a rotation speed detection circuit, being coupled to the roller brush driving motor and the microprocessor, and being configured for detecting a rotation speed of the roller brush driving motor.

11. The vacuum cleaner of claim 10, wherein said device further comprises:

a battery voltage detection circuit, being coupled to a rechargeable battery device of the vacuum cleaner, and being also coupled to the microprocessor;

wherein the battery voltage detection circuit is configured for detecting a real-time battery voltage of the rechargeable battery device, such that the microprocessor applies a proportional up-regulation treatment or a proportional down-regulation treatment to the at least one motor protection parameter according to the real-time battery voltage.

12. The vacuum cleaner of claim 11, wherein the microprocessor is further configured for:

receiving a rotation speed sampling signal from the rotation speed detection circuit, and then calculating a real-time rotation speed of the roller brush driving motor;

determining a load condition of the roller brush driving motor based on the real-time rotation speed and the operation current;

deciding one protection parameter set according to the product model and the load condition; and conducting one motor protection for the roller brush driving motor after loading the at least one motor protection parameter contained by the protection parameter set.

13. A device for conducting motor recognition and protection, being allowed to be employed in a vacuum cleaner comprising a machine body and a dust suction device, wherein the dust suction device consists of a suction head and a connection tube, and the suction head including a roller brush and a roller brush driving motor; said device comprising:

a detection circuit, being coupled to the roller brush driving motor, and being configured for monitoring the roller brush driving motor, so as to acquire a motor parameter; and a microprocessor, being coupled to the detection circuit;

wherein the microprocessor includes a memory storing an application program, and the application program including instructions, such that in case the application program is executed, the microprocessor being configured for:

receiving the motor parameter from the detection circuit in a run-up time period of the roller brush driving motor;

determining a product model of the roller brush driving motor based on the motor parameter;

deciding a protection parameter set according to the product model; and conducting a motor protection for the roller brush driving motor after loading at least one motor protection parameter contained by the protection parameter set.

14. The device of claim 13, wherein the motor parameter comprises operation current, voltage applied to the roller brush driving motor, rotation speed, and/or load condition.

\* \* \* \* \*